US012161166B2

(12) United States Patent
Liu et al.

(10) Patent No.: US 12,161,166 B2
(45) Date of Patent: Dec. 10, 2024

(54) ELECTRONIC CIGARETTE ATOMIZER

(71) Applicant: CHINA TOBACCO HUNAN INDUSTRIAL CO., LTD., Hunan (CN)

(72) Inventors: Jianfu Liu, Hunan (CN); Kejun Zhong, Hunan (CN); Xiaoyi Guo, Hunan (CN); Wei Huang, Hunan (CN); Xinqiang Yin, Hunan (CN); Jianhua Yi, Hunan (CN); Chaoxiang Huang, Hunan (CN); Yongquan Zhou, Hunan (CN)

(73) Assignee: CHINA TOBACCO HUNAN INDUSTRIAL CO., LTD., Hunan (CN)

( * ) Notice: Subject to any disclaimer, the term of this patent is extended or adjusted under 35 U.S.C. 154(b) by 284 days.

(21) Appl. No.: 17/638,794

(22) PCT Filed: Aug. 17, 2020

(86) PCT No.: PCT/CN2020/109418
§ 371 (c)(1),
(2) Date: Feb. 25, 2022

(87) PCT Pub. No.: WO2021/036837
PCT Pub. Date: Mar. 4, 2021

(65) Prior Publication Data

US 2022/0279857 A1 Sep. 8, 2022

(30) Foreign Application Priority Data

Aug. 26, 2019 (CN) ........................ 201910789864.9
Aug. 26, 2019 (CN) ........................ 201921394960.5
Aug. 26, 2019 (CN) ........................ 201921396744.4

(51) Int. Cl.
*A24F 40/485* (2020.01)
*A24F 40/10* (2020.01)
(Continued)

(52) U.S. Cl.
CPC ........... *A24F 40/485* (2020.01); *A24F 40/10* (2020.01); *A24F 40/44* (2020.01); *B05B 17/0684* (2013.01)

(58) Field of Classification Search
CPC ........ A24F 40/485; A24F 40/10; A24F 40/44; B05B 17/0684
(Continued)

(56) References Cited

U.S. PATENT DOCUMENTS 11,641,876 B2 * 5/2023 Liu ........................ A24F 40/40 131/329
2016/0157522 A1 * 6/2016 Zhu ........................ A24F 40/46 392/404
2020/0060336 A1 * 2/2020 Liu ........................ A24F 40/46

FOREIGN PATENT DOCUMENTS

CN 205671482 U 11/2016
CN 205947130 U 2/2017
(Continued)

OTHER PUBLICATIONS

International Search Report for International Application No. PCT/CN2020/109418 dated Oct. 28, 2020, 3 pages.

*Primary Examiner* — Gary F Paumen
(74) *Attorney, Agent, or Firm* — MASCHOFF BRENNAN; Michael Mauriel

(57) ABSTRACT

Disclosed is an electronic cigarette atomizer including a liquid cartridge (6) and an ultrasonic atomization piece (42) mounted vertically. The liquid cartridge (6) is located above the ultrasonic atomization piece (42), a liquid guide channel (311) communicated with the liquid cartridge (6) is disposed below the liquid cartridge (6), a liquid outlet (331) is
(Continued)

horizontally disposed in the liquid guide channel (311), and the caliber of the liquid outlet (331) is smaller than that of the liquid guide channel (311); and liquid guide cotton (43) is horizontally mounted across the ultrasonic atomization piece (42). The liquid guide cotton (43) is in contact with or attached to an atomization surface of the ultrasonic atomization piece (42), and the liquid outlet (331) abuts against the liquid guide cotton (43). With the electronic cigarette atomizer, when smoking, e-liquid is supplied in time, and e-liquid supply and ultrasonic atomization are balanced, such that the burning phenomenon can be prevented. When not smoking, the liquid outlets are blocked by means of the viscosity of the e-liquid itself and the liquid guide cotton (43), such that the e-liquid is prevented from being continuously conducted by the liquid guide cotton (43), and the situation where an atomization cavity is soaked in the e-liquid and liquid leakage is consequently caused is avoided.

10 Claims, 9 Drawing Sheets

(51) Int. Cl.
*A24F 40/44* (2020.01)
*B05B 17/06* (2006.01)

(58) Field of Classification Search
USPC .......................................................... 131/329
See application file for complete search history.

(56) References Cited

FOREIGN PATENT DOCUMENTS

| | | |
|---|---|---|
| CN | 205993633 U | 3/2017 |
| CN | 108078009 A | 5/2018 |
| CN | 209251755 U | 8/2019 |
| CN | 210642461 | 6/2020 |
| CN | 210642462 | 6/2020 |
| KR | 101820835 B1 | 1/2018 |

* cited by examiner

ELECTRONIC CIGARETTE ATOMIZER

CROSS REFERENCE TO RELATED APPLICATIONS

This application is a U.S. National Phase application under 35 U.S.C. § 371 of International Application No. PCT/CN2020/109418 filed on Aug. 17, 2020, which claims priority to Chinese Application No. 201910789864.9 filed on Aug. 26, 2019 and claims priority to Chinese Application No. 201921396744.4 filed on Aug. 26, 2019 and claims priority to Chinese Application No. 201921394960.5 filed on Aug. 26, 2019.

FIELD OF THE INVENTION

The present invention relates to an electronic cigarette utensil, in particular to an electronic cigarette atomizer.

BACKGROUND OF THE INVENTION

In an existing electronic cigarette atomizer with an ultrasonic atomization piece placed vertically, the path from a liquid outlet to the ultrasonic atomization piece is too long, such that e-liquid is conducted for a long time, and the burning phenomenon is consequently caused due to insufficient e-liquid supply when the user smokes continuously. When the user is not smoking, because liquid guide cotton is always in an e-liquid conduction state, excessive e-liquid may be in the atomization cavity to cause liquid leakage.

In addition, the electrical connection of the ultrasonic atomization piece in the existing ultrasonic atomizer is generally realized by welding an electronic wire on an atomization surface electrode, and a non-atomization surface electrode abuts against a spring electrode. When the ultrasonic atomization piece is working, the ultrasonic atomization piece oscillates at a high frequency to generate heat, which easily causes the welding spot for welding the electronic wire to fall off, and the spring electrode is also prone to failure, so poor electrical contact is easily caused to affect the normal operation of the ultrasonic atomization piece.

SUMMARY OF THE INVENTION

The technical problem to be solved by the present invention is to overcome the shortcomings of the prior art and provide an electronic cigarette atomizer which can supply e-liquid in time when smoking to prevent dry burning and can prevent the e-liquid from being conducted when not smoking.

In order to solve the above technical problem, the present invention provides an electronic cigarette atomizer, which includes a liquid cartridge and an ultrasonic atomization piece mounted vertically, wherein:

The liquid cartridge is located above the ultrasonic atomization piece, a liquid guide channel communicated with the liquid cartridge is disposed below the liquid cartridge, a liquid outlet is horizontally disposed in the liquid guide channels, and the caliber of the liquid outlets is smaller than that of the liquid guide channels;

Liquid guide cotton is horizontally mounted across the ultrasonic atomization piece, the liquid guide cotton is in contact with or attached to an atomization surface of the ultrasonic atomization piece, and the liquid outlets abut against the liquid guide cotton.

In the present invention, the liquid guide cotton is in contact with or attached to the atomization surface of the ultrasonic atomization piece, the liquid outlet communicated with the liquid cartridge abut against the liquid guide cotton that is in contact with the ultrasonic atomization piece, the interaction force between the ultrasonic atomization piece and the liquid outlet not only promotes better attachment of the liquid guide cotton to the ultrasonic atomization piece, but also makes the liquid storage quantity or liquid guide quantity of the liquid guide cotton is balanced with the atomization efficiency of the ultrasonic atomization piece because the caliber of the liquid outlet is smaller than that of the liquid guide channel, such that e-liquid is supplied in time when smoking to avoid dry burning, and the e-liquid is fully atomized to effectively prevent the user from inhaling the e-liquid; and when not smoking, the liquid outlet is blocked by means of the viscosity of the e-liquid and the liquid guide cotton, such that the e-liquid is prevented from being continuously conducted by the liquid guide cotton, and the situation where an atomization cavity is soaked in the e-liquid and liquid leakage is consequently caused is avoided.

In addition, because the liquid outlet directly abut against the ultrasonic atomization piece, when the ultrasonic atomization piece is working, the high-frequency oscillation at the liquid outlet (the ultrasonic atomization piece is in high-frequency oscillation when working) causes the e-liquid in the liquid cartridge to quickly flow to the liquid guide cotton and be supplied to the ultrasonic atomization piece for atomization, which reduces the time for the liquid guide cotton to conduct the e-liquid and effectively prevents the phenomenon of insufficient e-liquid supply at the high atomization efficiency.

Further, in order to control the quantity of e-liquid absorbed by the liquid guide cotton, prevent excessive e-liquid on the liquid guide cotton, and prevent the user from inhaling e-liquid droplets due to insufficient atomization of the ultrasonic atomization piece, the caliber of the liquid outlet is ⅓-⅙ of that of the liquid guide channel.

Further, in order to ensure that the liquid storage quantity or liquid guide quantity of the liquid guide cotton is balanced with the atomization efficiency of the ultrasonic atomization piece, and to prevent the user from inhaling the e-liquid, the liquid guide cotton crosses the center line of the ultrasonic atomization piece in the horizontal direction, and the contact area of the liquid guide cotton and the ultrasonic atomization piece is ½-⅕ of the area of the ultrasonic atomization piece, preferably ⅓-¼.

A specific implementation of the above solution is that the electronic cigarette atomizer includes a housing, an atomizing sleeve, a liquid guide support, and an atomizing core, the atomizing sleeve is sleeved in the housing, and the atomizing sleeve includes an upper segment and a lower segment; the upper segment is recessed relative to the lower segment to form the liquid cartridge between the outer wall of the upper segment and the housing, the top surface of the lower segment forms the bottom surface of the liquid cartridge, a channel is disposed in the bottom surface of the liquid cartridge, and a fixing groove communicated with the channel is disposed in the back of the lower segment; the liquid guide support is disposed under the atomizing sleeve, a support rib matching the fixing groove is disposed at the upper part of the liquid guide support, a liquid guide groove is disposed on a front side of the support rib, and the support rib is inserted into the fixing groove and the channel, such that the liquid guide groove is attached to the fixing groove to form the liquid guide channel; the atomizing core includes an atomizing seat for mounting the ultrasonic atomization piece, and the atomizing seat is mounted on the back of the atomizing sleeve.

Further, in order to prevent liquid leakage from the liquid outlets due to the skew of the liquid guide cotton, a second boss is disposed on the back of the liquid guide support, the liquid outlet is disposed in the second boss, a liquid guide cotton through groove is disposed on an outer side of the second boss, two ends of the liquid guide cotton are disposed in the liquid guide cotton through groove, and a middle part of the liquid guide cotton is pressed against the ultrasonic atomization piece by the second boss.

Further, a first boss is disposed on a top of the back of the support rib, and the first boss is engaged with the atomizing sleeve, such that the liquid guide support is connected with the atomizing sleeve more closely to prevent liquid leakage effectively.

Further, the atomizer further includes a base, a top of the base has two insertion portions, a clamping rib is disposed on two sides of the lower segment of the atomizing sleeve, the atomizing sleeve is combined with the liquid guide support to form a caulking groove between the clamping rib and the support rib, and the insertion portion of the base are inserted into the caulking groove to form connection.

Further, an air inlet is disposed at a middle part of the base, a vent groove is disposed on the back of the lower segment of the atomizing sleeve, and a middle part of the liquid guide support opposite to the vent groove is hollowed, such that the ultrasonic atomization piece, the liquid guide support and the vent groove enclose an atomization cavity; an air tube is disposed at the upper segment of the atomizing sleeve, a suction nozzle is disposed on a top surface of the housing, and the air inlet, the atomization cavity, the air tube, and the suction nozzle are communicated with each other to form an air flow channel.

Further, an atomization surface electrode of the ultrasonic atomization piece is connected to a first electrode, and a non-atomization surface electrode of the ultrasonic atomization piece is connected to a second electrode, wherein:

An end of the first electrode in contact with the ultrasonic atomization piece is a ring-shaped end, the ring-shaped end is provided with a first notch, the first notch divides the ring-shaped end into two segments, and the two segments are respectively provided with a third boss, such that the first electrode elastically abuts against the atomization surface electrode of the ultrasonic atomization piece through the third boss;

An end of the second electrode in contact with the ultrasonic atomization piece is provided with two second notches, a tongue piece is disposed between the two second notches, the tongue piece includes a straight segment and a raised segment that are not on the same plane, the straight segment and the raised segment are connected by a curved portion, and the second electrode elastically abuts against the non-atomization surface electrode of the ultrasonic atomization piece via the raised segment.

In the present invention, the end of the first electrode abutting against the atomization surface electrode of the ultrasonic atomization piece is a ring-shaped end, the ring-shaped end is provided with a first notch, the first notch divides the ring-shaped end into two segments, a third boss is disposed on each segment to elastically abut against the ultrasonic atomization piece, and the two segments of the ring-shaped end can be elastically deformed, such that the first electrode is in good contact with the ultrasonic atomization piece to achieve better conductivity. Similarly, a tongue piece is disposed on the second electrode abutting against the non-atomization surface electrode of the ultrasonic atomization piece, the tongue piece has a straight segment and a raised segment that are not on the same plane and are connected by a curved portion, such that the raised segment elastically abuts against the non-atomization surface electrode of the ultrasonic atomization piece to achieve better conductivity. In addition, the ring-shaped end of the first electrode and the tongue piece of the second electrode are both formed by bending sheets, so the electronic cigarette atomizer is durable and not easy to fail, ensures the normal working state of the ultrasonic atomization piece, and is easy to manufacture with low cost.

Further, the electronic cigarette atomizing core further includes an atomizing seat, and the ultrasonic atomization piece and the second electrode are clamped in the atomizing seat, such that the tongue piece of the second electrode is connected to the ultrasonic atomization piece more stably.

1—housing; 11—suction nozzle;

2—atomizing sleeve; 21—upper segment; 22—lower segment; 211—air tube; 221—channel; 222—clamping rib; 223—fixing groove; 224—vent groove; 225—atomizing core mounting space;

3—liquid guide support; 31—support rib; 32—base body; 311—liquid guide groove; 312—first boss; 33—second boss; 331—liquid outlet; 34—liquid guide cotton through groove;

4—atomizing core; 41—atomizing seat; 42—ultrasonic atomization piece; 43—liquid guide cotton; 44—first electrode; 45—second electrode; 441—first notch; 442—third boss; 451—polar body; 452—second notch; 453—tongue piece; 4531—straight segment; 4532—raised segment; 4533—curved portion;

5—base; 51—insertion portion; 52—air inlet;

6—liquid cartridge;

7—caulking groove.

DETAILED DESCRIPTION OF THE EMBODIMENTS

The present invention will be further described below with reference to specific preferred embodiments, but the scope of protection of the present invention is not limited thereby.

For ease of description, the relative positional relationships of components, such as upper, lower, left, and right, are described according to the layout direction of the accompanying drawings in the specification, and do not limit the structure of this patent.

Embodiment 1

Figure 1:
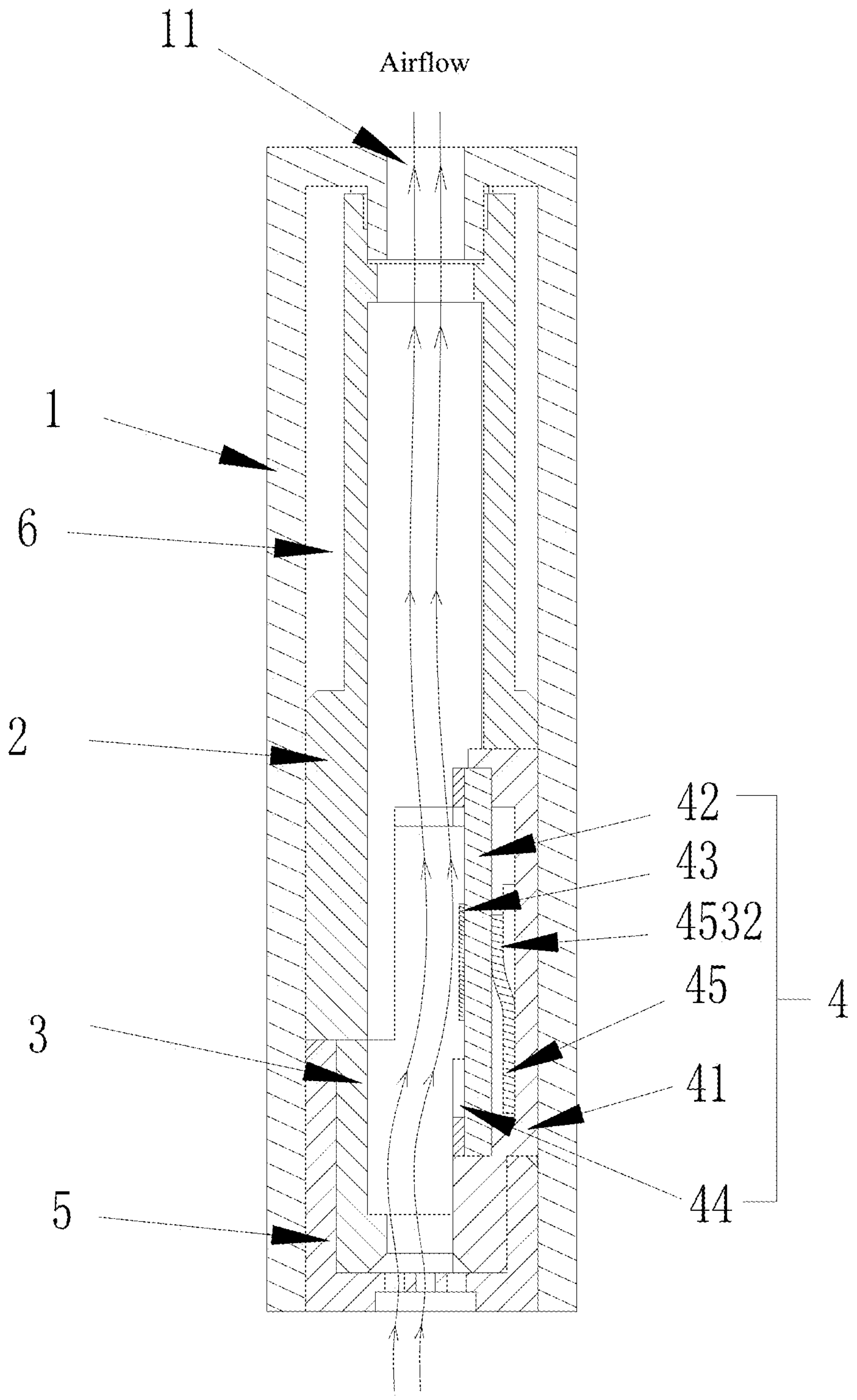
FIG. 1 is a schematic structural diagram of an atomizer of the present invention (arrows in the figure indicate the direction of air flow).
Figure 2:
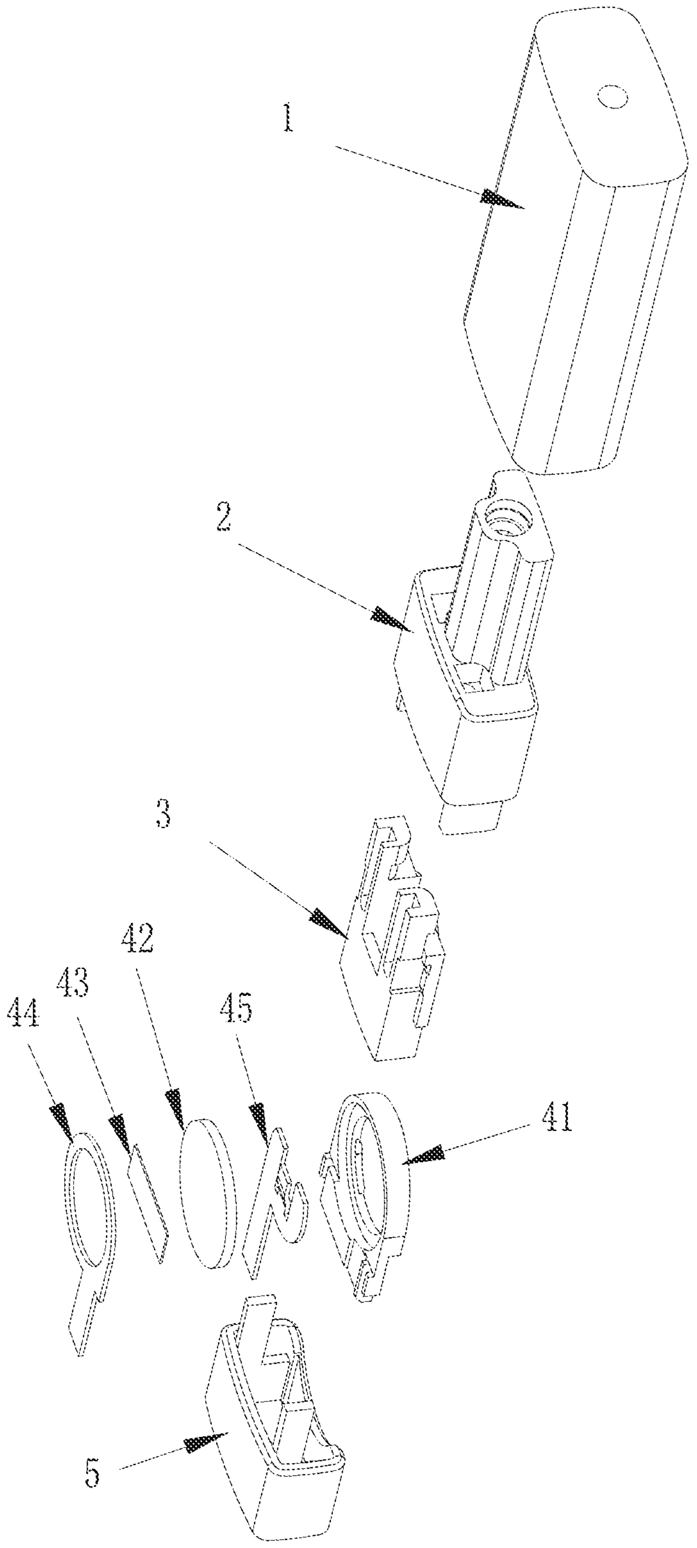
FIG. 2 is an exploded view of components of the atomizer of the present invention.
Figure 3:
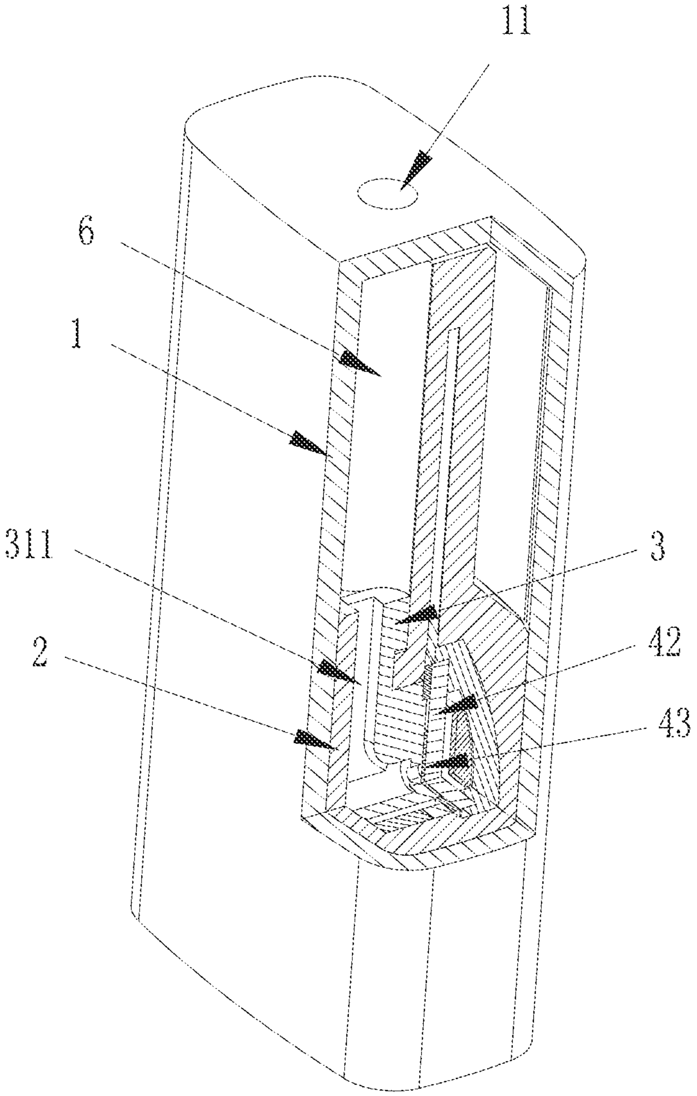
FIG. 3 is a partial cross-sectional three-dimensional diagram of the atomizer of the present invention.
Figure 4:
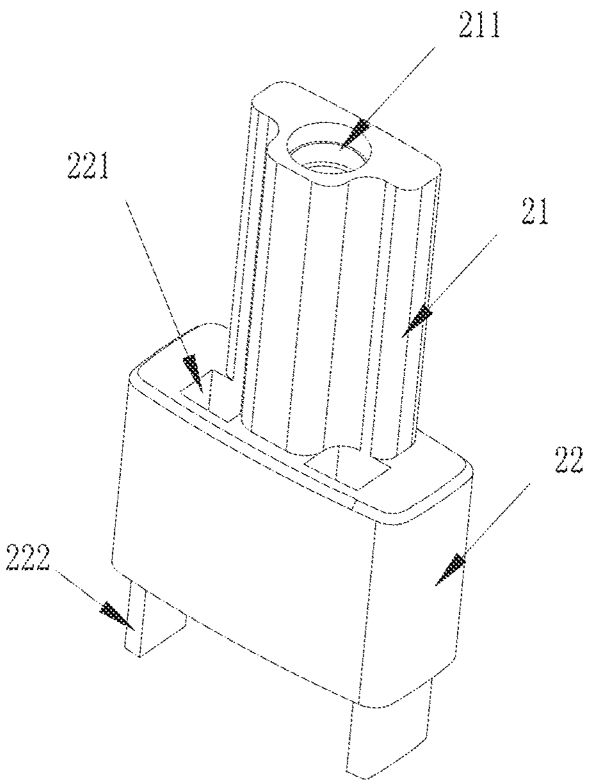
FIG. 4 is a front three-dimensional diagram of an atomizing sleeve of the present invention.
Figure 5:
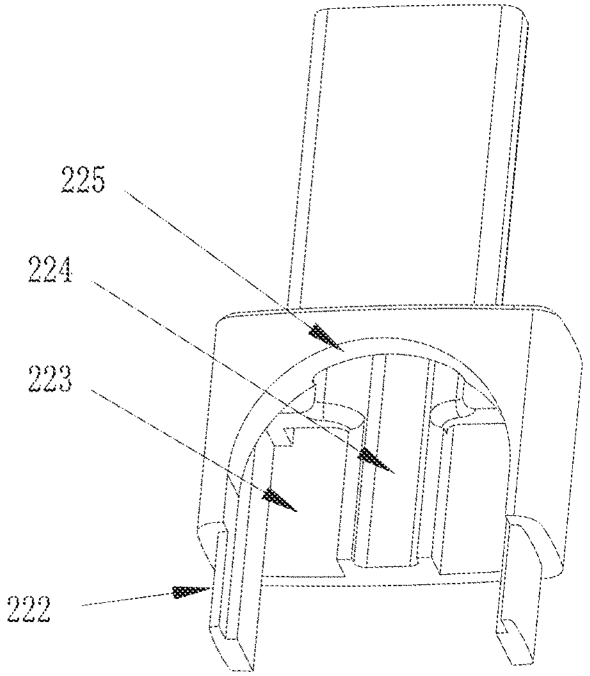
FIG. 5 is a back three-dimensional diagram of the atomizer of the present invention.
Figure 6:
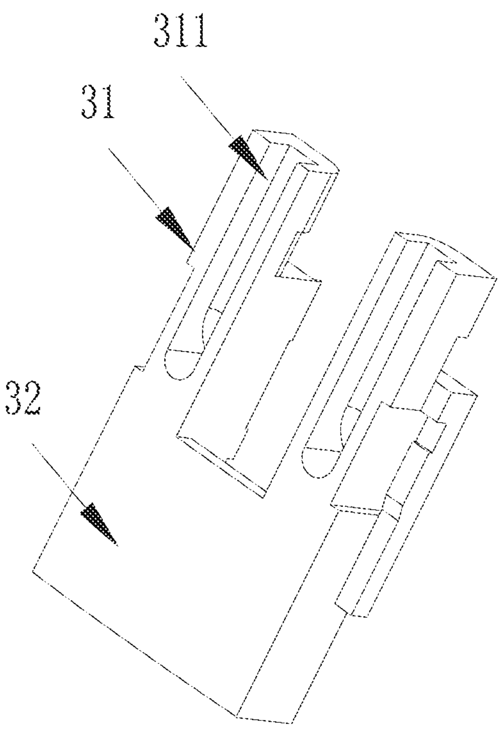
FIG. 6 is a front three-dimensional structural diagram of a liquid guide support of the present invention.
Figure 7:
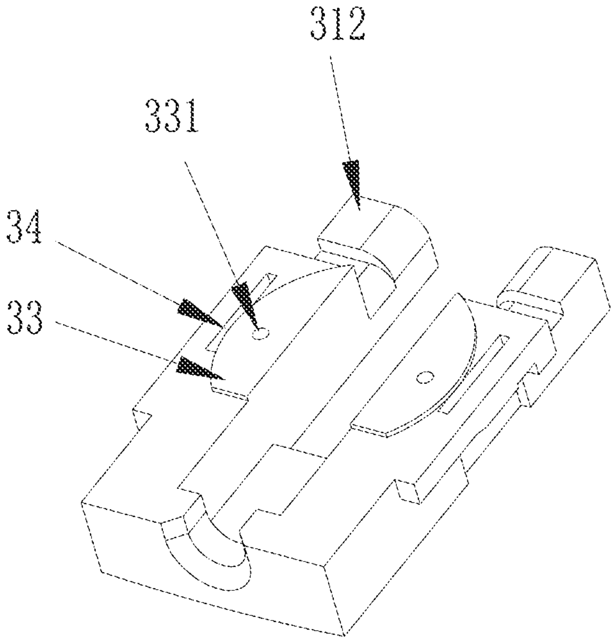
FIG. 7 is a back three-dimensional structural diagram of the liquid guide support of the present invention.
Figure 8:
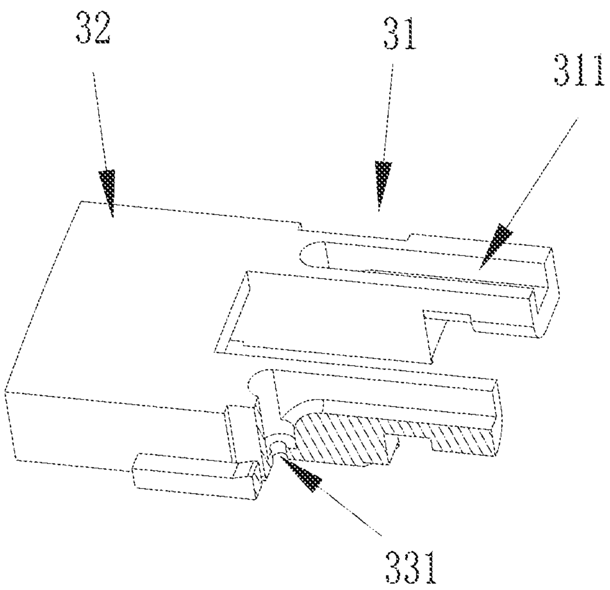
FIG. 8 is a partial cross-sectional three-dimensional structural diagram of the liquid guide support of the present invention.
Figure 9:
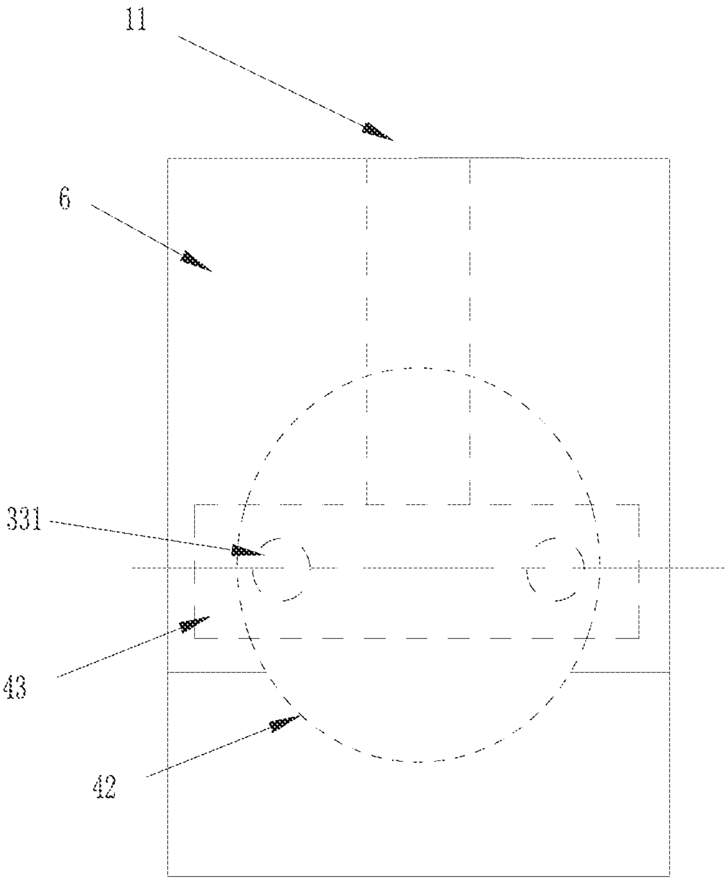
FIG. 9 is a schematic diagram of a mounting state of an ultrasonic atomization piece and liquid guide cotton of the present invention.
Figure 10:
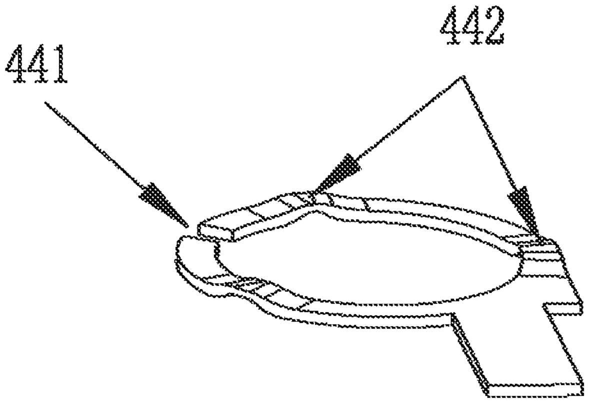
FIG. 10 is a schematic structural diagram of a first electrode of the present invention.
Figure 11:
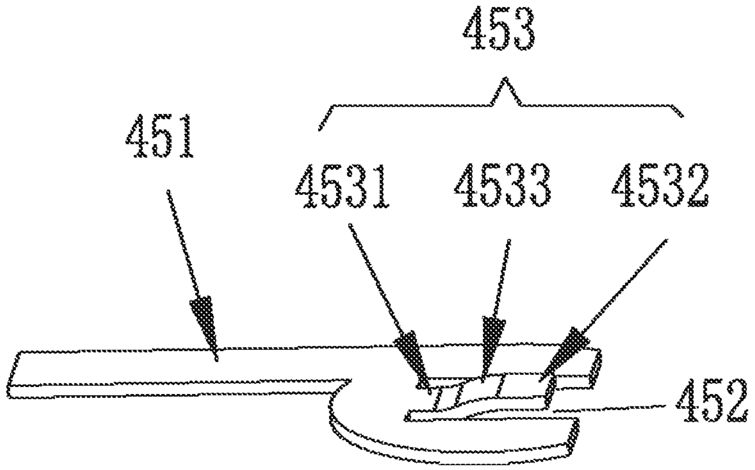
FIG. 11 is a schematic structural diagram of a second electrode of the present invention.
Figure 12:
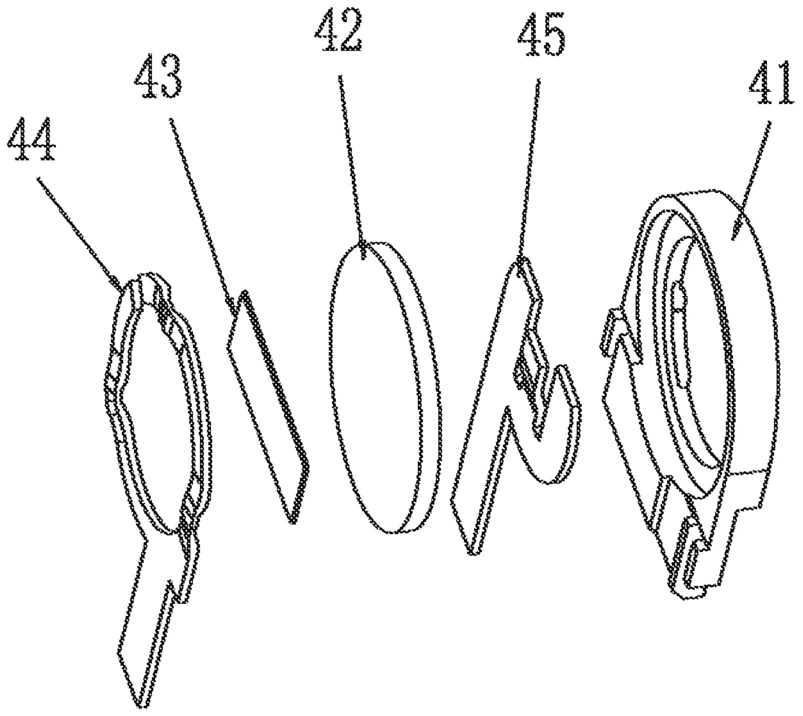
FIG. 12 is an exploded view of components of an atomizing core of the present invention.
Figure 13:
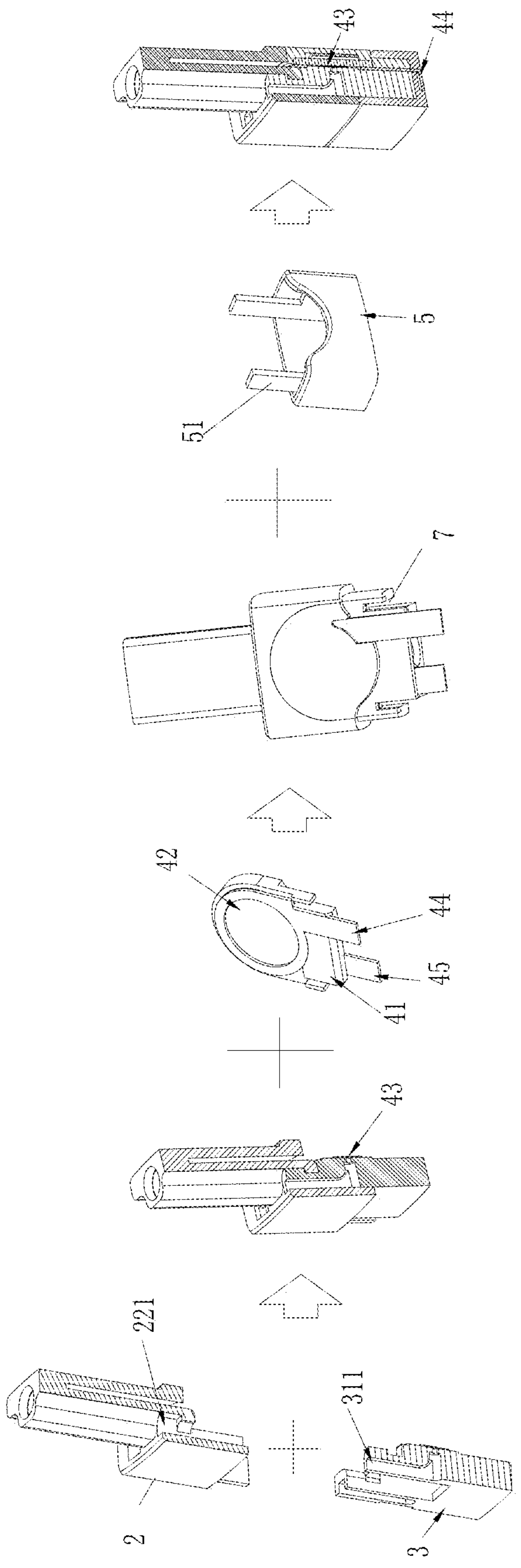
FIG. 13 is an assembly flowchart of the present invention.

As shown in FIGS. 1 to 13, an embodiment of an electronic cigarette atomizer of the present invention includes a housing 1, an atomizing sleeve 2, a liquid guide support 3, an atomizing core 4, and a base 5.

The housing 1 is provided with a suction nozzle 11 for sucking while smoking.

The atomizing sleeve 2 is divided into an upper segment 21 and a lower segment 22, the cross-sectional area of the upper segment 21 is smaller than that of the lower segment 22, and the whole atomizing sleeve 2 is sleeved in the housing 1, such that a liquid cartridge 6 is formed between the outer wall of the upper segment of the atomizing sleeve 2 and the housing 1, and the top surface of the lower segment 22 becomes the bottom surface of the liquid cartridge. Two channels 221 are disposed in the bottom surface of the liquid cartridge. A longitudinally penetrating air tube 211 is disposed at a middle part of the upper segment 21, and the top of the air tube 211 is communicated with the suction nozzle 11. Protruding clamping ribs 222 are respectively disposed on two sides of the lower segment 22, two fixing grooves 223 are disposed between the two clamping ribs 222, a vent groove 224 communicated with the air tube 211 is disposed between the two fixing grooves 223, and the two fixing grooves 223 are communicated with the two channels 221. An atomizing core mounting space 225 is disposed on the back of the lower segment 22.

The liquid guide support 3 is disposed under the atomizing sleeve 2. The liquid guide support 3 includes a base body 32 at the lower part and two support ribs 31 at the upper part, the two support ribs 31 are matched with the fixing grooves 223, liquid guide grooves 311 are disposed on front sides (the sides away from an ultrasonic atomization piece) of the support ribs 31, first bosses 312 are disposed on tops of backs (the sides close to the ultrasonic atomization piece) of the support ribs 31, and the two support ribs 31 are guided by the two fixing grooves 223 to pass through the two channels 221 of the atomizing sleeve 2, such that upper ends of the liquid guide grooves 311 are communicated with the liquid cartridge 6, and the first bosses 312 of the support ribs 31 are engaged with the atomizing sleeve 2. Meanwhile, after the support ribs 31 are inserted into the atomizing sleeve 2 along the fixing grooves 223, the fixing grooves 223 are attached to the surfaces of the liquid guide grooves 311 to form closed liquid guide channels.

Two second bosses 33 are symmetrically disposed on the back of the liquid guide support 3, the two second bosses 33 are provided with liquid outlets 331, liquid guide cotton through grooves 34 are disposed on outer sides of the two second bosses 33, and the two second bosses 33 opposite to the vent groove 224 are hollowed.

The liquid outlets 331 are communicated with the liquid guide grooves 311, and the caliber of the liquid outlets 331 is smaller than that of the liquid guide grooves 311 (the caliber of the liquid outlets 331 is ⅓-⅙ of that of the liquid guide grooves 311). Liquid outlet ends of the liquid outlets 331 abut against the liquid guide cotton 43, and the caliber of the liquid outlets 331 is smaller than that of the liquid guide grooves 311, which can control the quantity of e-liquid absorbed by the liquid guide cotton 43, to prevent the phenomenon that the user inhales e-liquid droplets due to insufficient atomization of the ultrasonic atomization piece 42 caused by excessive e-liquid on the liquid guide cotton 43.

The atomizing core 4 is mounted in the atomizing core mounting space 225 on the back of the atomizing sleeve 2, and an atomization surface of the ultrasonic atomization piece 42 is disposed toward the vent groove 224, such that the vent groove 224, the ultrasonic atomization piece 42 and the liquid guide support 3 enclose together to form an atomization cavity. The atomizing core 4 includes an atomizing seat 41 disposed vertically, the ultrasonic atomization piece 42 is vertically mounted in the atomizing seat 41, liquid guide cotton 43 is disposed across the atomization surface of the ultrasonic atomization piece 42, an atomization surface electrode of the ultrasonic atomization piece 42 is connected to a first electrode 44, and a non-atomization surface electrode is connected to a second electrode 45.

The end of the first electrode 44 in contact with the ultrasonic atomization piece is a ring-shaped end, the first electrode 44 abuts against an outer ring (the atomization surface electrode) of the atomization surface of the ultrasonic atomization piece 42 through its ring-shaped end, and the ring-shaped end is provided with a first notch 441. The first notch 441 divides the ring-shaped end into two segments, the two segments are respectively provided with third bosses 442, and the first electrode 44 elastically abuts against the atomization surface electrode of the ultrasonic atomization piece through the third bosses 442. In the presence of the first notch 441, the two segments of the ring-shaped end can be elastically deformed, so the first electrode 44 is in better contact with the atomization surface electrode of the ultrasonic atomization piece 42, that is, the first electrode 44 has better conductivity. The second electrode 45 includes a polar body 451, and the end of the polar body 451 in contact with the ultrasonic atomization piece is provided with two second notches 452, such that the middle part of the polar body 451 in contact with the ultrasonic atomization piece forms a tongue piece 453. The tongue piece 453 includes a straight segment 4531 and a raised segment 4532, the straight segment 4531 and the raised segment 4532 are not on the same plane, and the straight segment 4531 and the raised segment 4532 are connected by a curved portion 4533, such that the raised segment 4532 has elasticity, the second electrode 45 elastically abuts against the non-atomization surface electrode of the ultrasonic atomization piece 42 via the raised segment 4532, and the second electrode 45 is in better contact with the non-atomization surface electrode of the ultrasonic atomization piece 42, that is, the second electrode 45 has better conductivity.

When assembling, the second electrode 45 is first clamped in the atomizing seat 41, then the ultrasonic atomization piece 42, the liquid guide cotton 43, and the first electrode 44 are mounted in sequence, the raised segment 4532 of the tongue piece 453 abuts against the non-atomization surface electrode of the ultrasonic atomization piece 42, the third bosses 442 of the first electrode 44 abut against the atomization surface electrode of the ultrasonic atomization piece 42 to conduct electricity, and the other end of the first electrode 44 extends downward and is bent and buckled on the base 5 for electrical contact.

Two ends of the liquid guide cotton 43 are inserted into the liquid guide cotton through grooves 34 of the liquid guide support 3 and fixed, and the middle part of the liquid guide cotton 43 is pressed against the atomization surface of the ultrasonic atomization piece 42 by the second bosses 33 to form contact, which can prevent the liquid guide cotton 43 from skewing to cause liquid leakage of the liquid outlets 331. The liquid outlets 331 abut against the liquid guide cotton 43, which not only enables the liquid guide cotton 43 to absorb enough e-liquid to supply the ultrasonic atomization piece 42 for ultrasonic atomization, but also the interaction force between the ultrasonic atomization piece 42 and the liquid outlets 331 promotes better attachment of the liquid guide cotton 43 to the ultrasonic atomization piece 42.

The liquid guide cotton 43 crosses the center line of the ultrasonic atomization piece 42, and the contact area between the liquid guide cotton 43 and the ultrasonic atomization piece 42 is ½-⅕ of the area of the ultrasonic atomization piece, preferably ⅓-¼, so that the liquid storage quantity or liquid guide quantity of the liquid guide cotton 43 is balanced with the atomization efficiency of the ultrasonic atomization piece 42 to prevent the user from inhaling the e-liquid.

The liquid outlets 331 directly abut against the ultrasonic atomization piece 42 via the liquid guide cotton 43, which reduces the time for the liquid guide cotton 43 to conduct the e-liquid and can prevent the phenomenon of insufficient e-liquid supply at the high atomization efficiency.

The base 5 is disposed under the atomizing sleeve 2, the liquid guide support 3 and the atomizing core 4, and the top of the base 5 has two insertion portions 51. The atomizing sleeve 2 is combined with the liquid guide support 3 to form caulking grooves 7 between the clamping ribs 222 and the support ribs 31, and the insertion portions 51 are combined with the caulking grooves 7 to realize the connection of the base 5. The bottom end of the first electrode 44 is bent and buckled on the base 5 for electrical contact. The base 5 is further provided with an air inlet 52 communicated with a channel 35, such that the air inlet 52, the channel 35, the air tube 211 and the suction nozzle 11 are communicated with each other to form an air flow channel.

When the present invention is used, e-liquid is injected into the liquid cartridge 6 which is disposed on the ultrasonic atomization piece 42. The e-liquid is conducted through the liquid guide grooves 311 and the liquid outlets 331 to the liquid guide cotton 43 that is in contact with or attached to the atomization surface of the ultrasonic atomization piece 42, and can be ultrasonically atomized by the ultrasonic atomization piece 42. Outside air flow enters from the air inlet 52 and takes away the smoke generated by the ultrasonic atomization via the channel 35, and the smoke is inhaled by the user via the air tube 211 and the suction nozzle 11.

The forgoing descriptions are only preferred embodiments of the present application, and do not limit the present application in any form. Although the present application is disclosed above with the preferred embodiments, the present application is not limited thereto. Some variations or modifications made by any skilled person familiar with the art using the disclosed technical contents without departing from the scope of the technical solution of the present application are equivalent to the embodiments, and all fall within the scope of the technical solution.

The invention claimed is:

1. An electronic cigarette atomizer, comprising a liquid cartridge (6), an ultrasonic atomization piece (42) mounted vertically, a housing (1), an atomizing sleeve (2), a liquid guide support (3), and an atomizing core (4), wherein:

the liquid cartridge is located above the ultrasonic atomization piece, a liquid guide channel communicated with the liquid cartridge is disposed below the liquid cartridge, a liquid outlet (331) is horizontally disposed in the liquid guide channel, and the caliber of the liquid outlet is smaller than that of the liquid guide channel;

a liquid guide cotton (43) is horizontally mounted across the ultrasonic atomization piece, the liquid guide cotton is in contact with or attached to an atomization surface of the ultrasonic atomization piece, and the liquid outlet abuts against the liquid guide cotton; and the atomizing sleeve is sleeved in the housing, and the atomizing sleeve comprises an upper segment (21) and a lower segment (22); the upper segment is recessed relative to the lower segment to form the liquid cartridge between an outer wall of the upper segment and the housing, a top surface of the lower segment forms a bottom surface of the liquid cartridge, a channel (221) is disposed in the bottom surface of the liquid cartridge, and a fixing groove (223) communicated with the channel is disposed in the back of the lower segment; the liquid guide support is disposed under the atomizing sleeve, a support rib (31) matching the fixing groove is disposed at the upper part of the liquid guide support, a liquid guide groove (311) is disposed on a front side of the support rib, and the support rib is inserted into the fixing groove and the channel, such that the liquid guide groove is attached to the fixing groove to form the liquid guide channels; the atomizing core comprises an atomizing seat (41) for mounting the ultrasonic atomization piece, and the atomizing seat is mounted on the back of the atomizing sleeve.

2. The electronic cigarette atomizer according to claim 1, wherein the caliber of the liquid outlet is ⅓-⅙ of that of the liquid guide channel.

3. The electronic cigarette atomizer according to claim 1, wherein the liquid guide cotton crosses a center line of the ultrasonic atomization piece in the horizontal direction, and a contact area of the liquid guide cotton and the ultrasonic atomization piece is ½-⅕ of an area of the ultrasonic atomization piece.

4. The electronic cigarette atomizer according to claim 1, wherein the liquid guide cotton crosses a center line of the ultrasonic atomization piece in the horizontal direction, and a contact area of the liquid guide cotton and the ultrasonic atomization piece is ⅓-¼ of an area of the ultrasonic atomization piece.

5. The electronic cigarette atomizer according to claim 1, wherein a second boss (33) is disposed on the back of the liquid guide support, the liquid outlet is disposed in the second boss, a liquid guide cotton through groove (34) is disposed on an outer side of the second boss, two ends of the liquid guide cotton are disposed in the liquid guide cotton through groove, and a middle part of the liquid guide cotton is pressed against the ultrasonic atomization piece by the second boss.

6. The electronic cigarette atomizer according to claim 1, wherein a first boss (312) is disposed on a top of a back of the support rib, and the first boss is engaged with the atomizing sleeve.

7. The electronic cigarette atomizer according to claim 1, further comprising a base (5), wherein a top of the base has two insertion portions (51), a clamping rib (222) is disposed on two sides of the lower segment of the atomizing sleeve, the atomizing sleeve is combined with the liquid guide support to form a caulking groove (7) between the clamping rib and the support rib, and the insertion portion of the base is inserted into the caulking groove to form a connection.

8. The electronic cigarette atomizer according to claim 7, wherein an air inlet (52) is disposed at a middle part of the base, a vent groove (224) is disposed on the back of the lower segment of the atomizing sleeve, and a middle part of the liquid guide support opposite to the vent groove is hollowed, such that the ultrasonic atomization piece, the liquid guide support and the vent groove enclose an atomization cavity; an air tube (211) is disposed at the upper segment of the atomizing sleeve, a suction nozzle (11) is disposed on a top surface of the housing, and the air inlet, the atomization cavity, the air tube, and the suction nozzle are communicated with each other to form an air flow channel.

9. The electronic cigarette atomizer according to claim 1, wherein an atomization surface electrode of the ultrasonic atomization piece is connected to a first electrode (44), and a non-atomization surface electrode of the ultrasonic atomization piece is connected to a second electrode (45);

an end of the first electrode in contact with the ultrasonic atomization piece is a ring-shaped end, the ring-shaped end is provided with a first notch (441), the first notch divides the ring-shaped end into two segments, and the two segments are respectively provided with a third boss (442), such that the first electrode elastically abuts against the atomization surface electrode of the ultrasonic atomization piece through the third boss; and an end of the second electrode in contact with the ultrasonic atomization piece is provided with two second notches (452), a tongue piece (453) is disposed between the two second notches, the tongue piece comprises a straight segment (4531) and a raised segment (4532) that are not on the same plane, the straight segment and the raised segment are connected by a curved portion (4533), and the second electrode elastically abuts against the non-atomization surface electrode of the ultrasonic atomization piece via the raised segment.

10. The electronic cigarette atomizer according to claim 9, further comprising an atomizing seat (41), wherein the ultrasonic atomization piece and the second electrode are clamped in the atomizing seat.

* * * * *